US012717770B2

(12) United States Patent
Alluru et al.

(10) Patent No.: US 12,717,770 B2
(45) Date of Patent: Aug. 25, 2026

(54) CREATING CONSISTENT COPIES OF A DATABASE

(71) Applicant: Salesforce, Inc., San Francisco, CA (US)

(72) Inventors: Sai Rama Raju Alluru, Hyderabad (IN); Swaroop Jayanthi, Hyderabad (IN)

(73) Assignee: Salesforce, Inc., San Francisco, CA (US)

(*) Notice: Subject to any disclaimer, the term of this patent is extended or adjusted under 35 U.S.C. 154(b) by 671 days.

(21) Appl. No.: 18/090,461

(22) Filed: Dec. 28, 2022

(65) Prior Publication Data

US 2024/0220478 A1 Jul. 4, 2024

(51) Int. Cl.
*G06F 16/23* (2019.01)
*G06F 16/27* (2019.01)

(52) U.S. Cl.
CPC ...... *G06F 16/2365* (2019.01); *G06F 16/2386* (2019.01); *G06F 16/275* (2019.01)

(58) Field of Classification Search
None
See application file for complete search history.

(56) References Cited

U.S. PATENT DOCUMENTS 5,799,322 A * 8/1998 Mosher, Jr. ............. G06F 16/27 714/E11.107
6,484,187 B1 * 11/2002 Kern ................... G06F 16/2322
7,885,923 B1 * 2/2011 Tawri .................. G06F 11/2074 707/610
8,401,997 B1 * 3/2013 Tawri .................. G06F 11/2071 707/655
11,030,219 B1 * 6/2021 Holenstein .............. G06F 16/27
2004/0260736 A1 * 12/2004 Kern ................... G06F 11/2058
2005/0204105 A1 * 9/2005 Kawamura ......... G06F 11/2064 711/162
2010/0198949 A1 * 8/2010 Elrom .................. G06F 16/273 709/222
2010/0287554 A1 * 11/2010 Amundsen ............ G06F 9/5038 718/101
2012/0054245 A1 * 3/2012 Colle .................... G06F 16/214 707/792
2016/0371358 A1 * 12/2016 Lee ..................... G06F 16/2343
2017/0060695 A1 * 3/2017 Clare .................. G06F 11/1451
2019/0034453 A1 * 1/2019 Jarvis .................... G06F 16/113
2021/0117286 A1 * 4/2021 Wang .................... H04L 9/0643

* cited by examiner

*Primary Examiner* — Irene Baker

(57) ABSTRACT

A system generates consistent copies of data stored in a source database in a plurality of target database systems. The system sends a change data stream from the source database system to the target database systems for performing data updates. The system receives timestamps of a latest transactions processed by consumer processes updating the target database system. The system determines a pause timestamp that occurs after the received transactions. The updates to the target database systems are paused once a transaction corresponding to the pause timestamp is processed. The pause timestamp is used to generate a consistent copy of a source database system in a target database system using multiple partitioned change data streams, each partitioned change data stream processing transactions associated with a partition of the source database system.

17 Claims, 9 Drawing Sheets

CREATING CONSISTENT COPIES OF A DATABASE

BACKGROUND

Field of Art

This disclosure relates in general to databases and more specifically to creating replicating a database to create a consistent copy of the database.

Description of the Related Art

An enterprise may store data in databases having different architectures and databases offered by different database vendors, for example, MYSQL, ORACLE, SQL SERVER, POSTGRES, and so on. The data stored in a database used in production typically changes constantly as a result of changes to the data stored in the database. Data stored in a production database system may have to be copied to a target database system, for example, for reproducing a problem encountered in the production database system. If a production database is copied to other database systems, it is challenging to obtain a consistent copy of the data stored in the production database system. For example, the production database may be copied using multiple processes executing in parallel. In this situation, one of the processes may fail resulting in partial information being copied to a target database system. Alternatively, one of the processes may execute much slowly compared to the other process, for example, due to differences in hardware. As a result, the data in the target database may reflect data from different points in time from the production database, depending on the process used to copy that subset of data. As a result, the data in the target database does not represent a consistent copy of the production database. Similarly, the production database system may be copied to two target database systems, each using different database architecture that may execute on different type of hardware. In this situation, it is challenging to ensure that the two target database systems are consistent with respect to each other.

Figure 1:
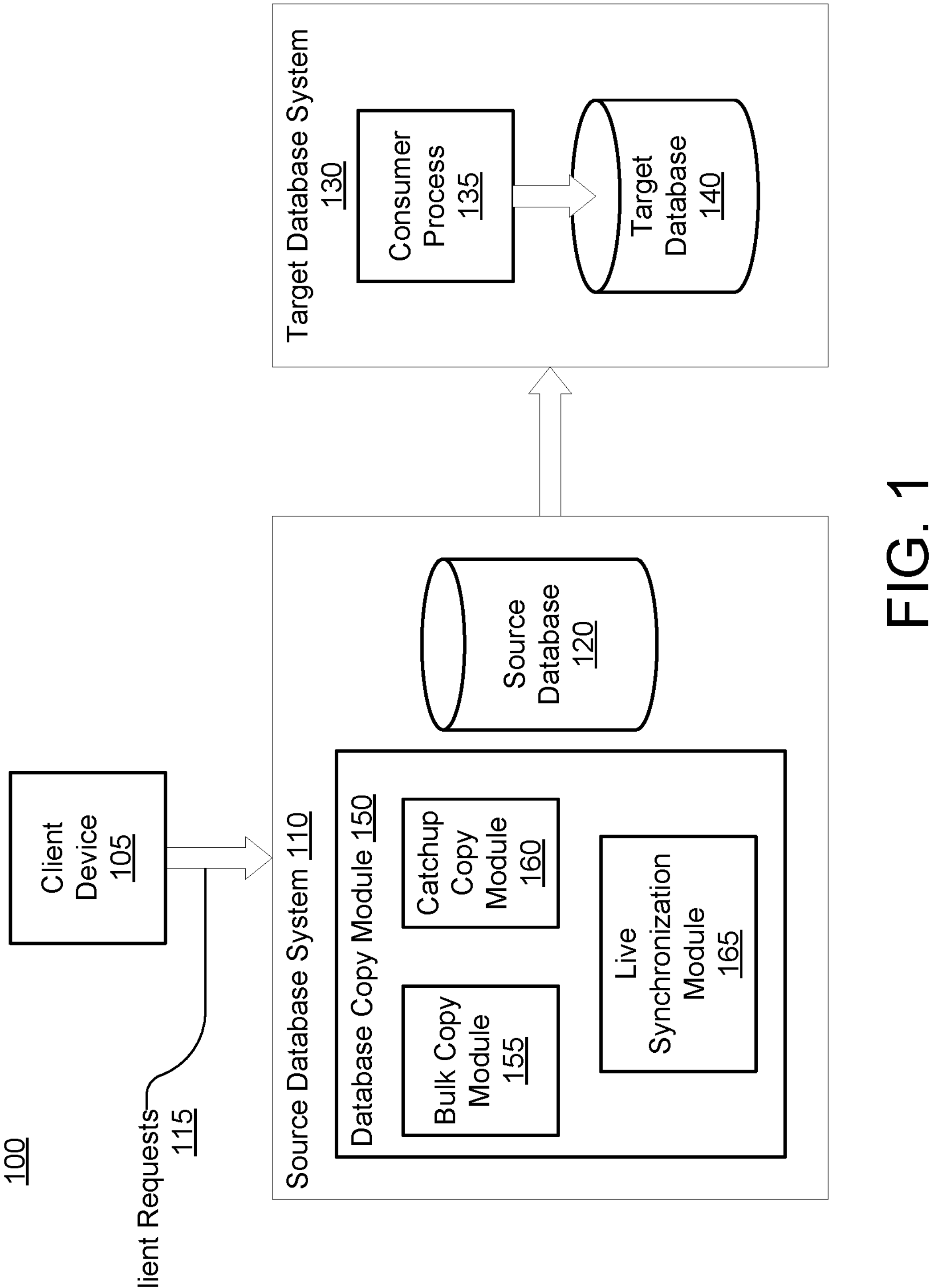
FIG. 1 is a block diagram of a system environment illustrating copying of data stored in a database from a source database system to a target database system, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115*a*," indicates that the text refers specifically to the element having that particular reference numeral. A reference numeral in the text without a following letter, such as "115," refers to any or all of the elements in the figures bearing that reference numeral.

DETAILED DESCRIPTION

A system according an embodiment generates consistent copies of data stored in a source database in a plurality of target database systems. The system copies data from the source database system to a target database system TD1 and a target database system TD2. According to an embodiment, the copying of the data comprises a bulk copy phase and a catchup phase. The system sends a change data stream from the source database system to the target database systems TD1 and TD2 for performing data updates using the change data stream. The change data stream comprises a sequence or a set of transactions executed by the source database system. The system receives a timestamp t1 of a latest transaction processed by a consumer process processing the change data stream for the target database system TD1 and a timestamp t2 of a latest transaction processed by a consumer process processing the change data stream for the target database system TD2. The system determines a pause timestamp that occurs after the timestamps t1 and t2. The system sends the pause timestamp to the target database systems TD1 and TD2. The target database systems TD1 and pause data updates after processing a transaction corresponding to the pause timestamp, for example, a transaction that has a commit time within a threshold of the pause timestamp. Responsive to the pausing data updates in the target database systems TD1 and TD2, the system sends indication that the target database systems TD1 and TD2 have reached a consistent state.

According to an embodiment, the system copies data of a source database system to a target database system in parallel using multiple partitioned change data streams. The system receives a request to copy data from the source database system to the target database system. The system generates multiple partitioned change data streams including a partitioned change data stream P1 and a partitioned change data stream P2 that concurrently copy data from the source database system to the target database system. The system receives a timestamp of a latest transaction processed by the target database system. The system determines a pause timestamp that occurs after the received timestamp. The system sends the pause timestamp to the target database system. The system pauses data updates to the target database system after processing a transaction within a threshold time of the pause timestamp from each partitioned change data stream P1 and P2. responsive to the target database system pausing data updates, the system sends an indication that the target database system has reached a consistent state.

According to an embodiment, the pause timestamp occurs after an additional time delay after the greater of the timestamps t1 and t2 in above embodiments. The additional time delay is determined based on an estimate of time taken to update configuration of a consumer process that processes the change data streams. The configuration of the consumer processes is updated to pause the updates to the target database system after processing a transaction received in the change data stream with a timestamp within the threshold of the pause timestamp.

Overall System Environment

FIG. 1 is a block diagram of a system environment illustrating copying of data stored in a database from a source database system to a target database system, according to one embodiment. The system environment 100 comprises a source database system 110, a target database system 130, and one or more client devices 105. In other embodiments, the system environment 100 may include other more or fewer components, for example, there may be third party systems that interact with the online system 110. The term system used herein refers to the overall system environment and may include modules that execute in the source database system 110 or the target database system 130. The system creates a point-in-time consistent copy of a database of the source database system 110 in the target database system 130. The system creates a copy of the database by a bulk copy of data and sending a change data stream of transactions executed in the source database system to the target database system. The bulk copy phase is also referred to herein as the cloning phase. A transaction represents changes performed to one more database tables. Although embodiments are described using terminology of relational databases, the techniques described may be applied to other types of database systems, for example, document-based database systems, NOSQL database systems, graph database systems, and so on.

The system according to an embodiment, performs heterogeneous copies of database, for example, a copy of a database implemented using a particular database architecture to a database implemented using a different architecture. The system also performs a copy of database provided by one database vendor to a database provided by another database vendor, for example, the source database system may be an ORACLE database and a target database system may be MYSQL database or a POSTGRES database system. A database vendor may also be referred to herein as a database provider.

The source database system 110 includes a source database 120 and a database copy module 150. The target database system 130 includes a target database 140 and a consumer process 135 that may be executed by a consumer module. A database, for example, the source database 120 or the target database 140 stores data and may allow users to perform database operations including queries that access data as well as database commands that modify the data. For example, the database may store records comprising fields and a query may insert new records, update existing records, and delete records. A query may request fields of records. For a multi-tenant system, the database may store data for multiple enterprises, each enterprise representing a tenant of the multi-tenant system.

A database processes queries to process data stored in database. In an embodiment, the database processes queries in a particular query language, for example, structured query language (SQL). A query may be used to perform an action using the database, for example, update a record, add new record, or delete a record. The query may be used to access information, for example, values stored in one or more records.

The source database system 110 and the target database system 130 may include other modules than those shown in FIG. 1. Functionality indicated as being performed by a particular module as described herein may be performed by other modules. Furthermore, although the database copy module 150 is shown as part of the source database system, in other embodiments, the database copy module 150 may be part of another system or various modules within the database copy module 150 may be part of different systems. The processes described herein may be used for data migration, for example, for migrating data or applications. The system may migrate data from one version of a database system to another version of a database system. The system may migrate from a particular type of database to another type of database, for example, from database provided by a particular database vendor to a database provided by another database vendor. The system according to various embodiment, performs data migration that deliver a point in time consistent copy to the target database system that may be used for various testing scenarios.

The database copy module 150 comprises a bulk copy module 155, a catchup copy module 160, and a live synchronization module 165. The database copy module 150 may also be referred to herein as a data synchronization service. These modules execute various steps of a database copy process as shown in FIG. 2.

Figure 2:
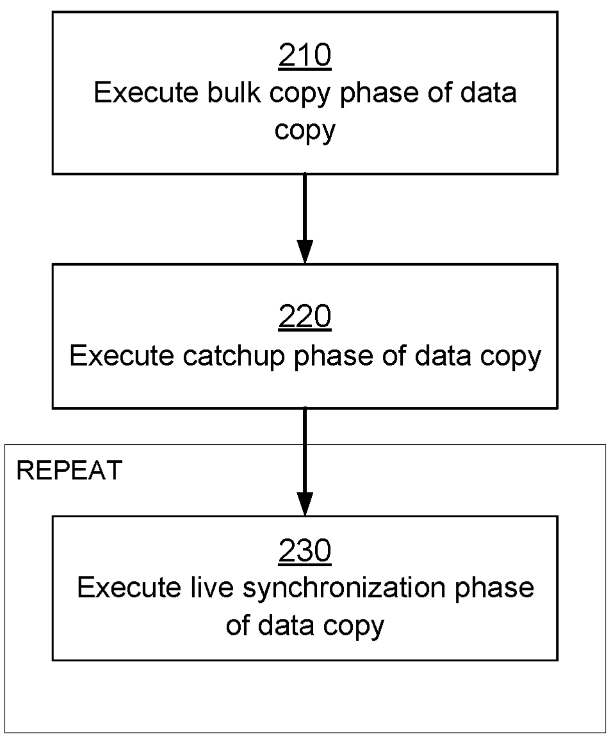
FIG. 2 is a flow chart illustrating the process for copying of data stored in a database from a source database system to a target database system, according to one embodiment.

FIG. 2 is a flow chart illustrating the process for copying of data stored in a database from a source database system 110 to a target database system 130, according to one embodiment. Steps shown in FIG. 2 may be executed by modules different from those indicated herein. Various embodiments can perform the steps of the processes in different orders than those indicated herein. Moreover, other embodiments can include different and/or additional steps than the ones described herein.

The bulk copy module 155 executes 210 a bulk copy phase that performs a bulk copy of the data stored in the source database system 110 to the target database system 130. During the bulk copy phase, the database records are copied from source database system to the target database system. This can be a long running process that could take hours or days to execute. As a result, during the bulk copy phase, the data of the source database 120 may change. The system copies the changes that occur using a change data stream. The change data stream is sent by the database copy module 150 to the target database system and processed by the consumer process 135 that receives the change data stream, analyzes the change data stream to identify the database operations corresponding to the transactions represented by the change data stream and applies the database operations to the target database 140. According to an embodiment, the change data stream comprises an ordered stream of transactions as they are committed on the source database. Each transaction has a commit time representing the time that the transaction was committed on the source database system.

According to an embodiment, the system executes change data capture (CDC) that refers to the process of identifying and capturing changes made to data in a database and then delivering those changes in real-time as a change data stream to a downstream process or system. According to an embodiment, the system extracts transaction logs of the source database system and generates the change data stream based on the transaction logs. According to an embodiment, the system sends database operations in the change data stream. These operations are executed on the target database system to reflect the changes performed in the source database system.

The catchup copy module 160 executes 220 a catchup phase of data copy. During the catchup phase, the changes that occurred in the source database 120 during the bulk copy phase are applied to the target database 140. The catchup phase brings the target database 140 to a transactionally consistent state. However, if the source database system 110 is a production system, the data stored in the source database 120 may keep getting modified as a result of ongoing transactions, for example, transactions performed as a result of client requests 115 received from client devices 105.

The live synchronization module 165 repeatedly executes 230 the live synchronization phase of data copy. During the live synchronization phase, the changes occurring on the source database 120 are continuously applied to the target database 140. In this phase the system ensures that the target database 140 is in a point-in-time consistent state with respect to the source database 120.

In some embodiments, the source database system 110 is part of a multi-tenant system. Each tenant may be an enterprise. Each tenant may represent a customer of the multi-tenant system that has multiple users that interact with the multi-tenant system via client devices.

A multi-tenant system stores data for multiple tenants in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system may execute an application server that simultaneously processes requests for a number of tenants. However, the multi-tenant system enforces tenant-level data isolation to ensure that jobs of one tenant do not access data of other tenants.

The source database 120 stores database records representing data that is processed by the source database system 110. In embodiments where the source database system is part of a multi-tenant system, the source database 120 stores data for various tenants of the multi-tenant system. The source database 120 may store data for different tenants in separate physical structures, for example, separate database tables or separate databases. Alternatively, the source database 120 may store data of multiple tenants in a shared structure. For example, user accounts for all tenants may share the same database table. However, the multi-tenant system stores additional information to logically separate data of different tenants. In embodiments that implement a multi-tenant system, the system and processes described herein allow copy of data for a particular tenant from the source database system 110 to the target database system 130.

In one embodiment, the source database system 110 is part of a multi-tenant system that implements a web-based customer relationship management (CRM) system and an application server that provides users access to applications configured to implement and execute CRM software applications.

The client device 105 comprises a user interface that may be provided by an application executing on the client device 105, for example, a browser application. A user may use the user interface to interact with the online system 110. For example, the user may execute an application in connection with an interaction with one or more other users to complete a transaction.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the system architecture and the processes described herein are illustrated using a multi-tenant system, the techniques disclosed are not limited to multi-tenant systems but can be executed by any online system, for example, an online system used by a single enterprise.

Copying Database to Multiple Targets

The system may copy data stored in a source database to multiple target databases. Each target database may use a different database technology, for example, a different database architecture or a database offered by a different database vendor. Developers perform testing of the target database systems to ensure that applications executing using the target database systems have the same behavior as the corresponding application executing using the source database system. A system may make a copy of the source database system to a target database system that uses the same technology as the source database system to reproduce an issue observed in the source database system, for example a defect observed in a production environment. In some embodiments, the data of the source database system is copied to two or more target database systems to perform A/B testing that comprises running different tests on the target database systems and observing the results of the test for validation.

Figure 3:
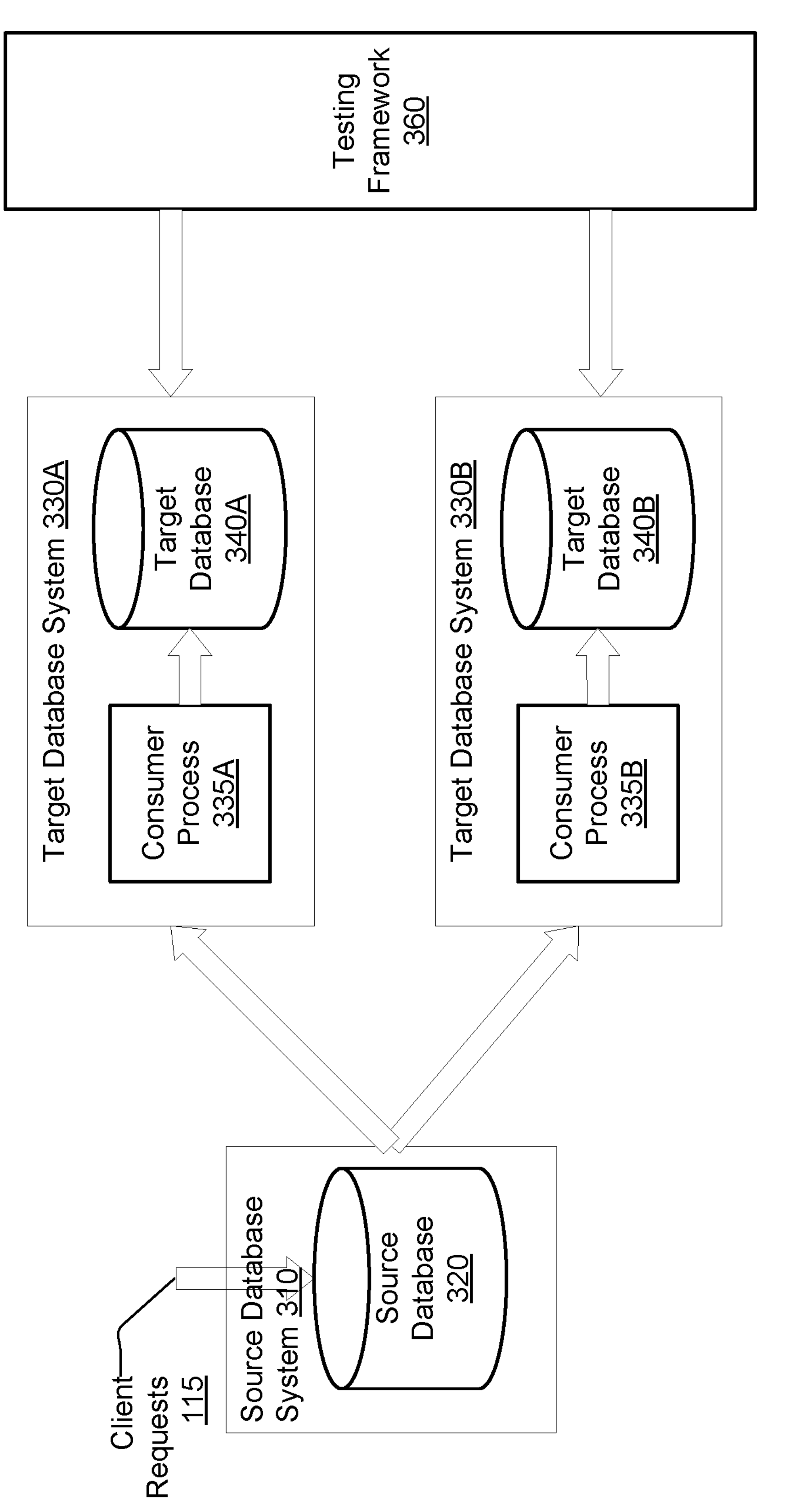
FIG. 3 is a block diagram illustrating a system environment for copying a source database to multiple target databases, according to an embodiment.

FIG. 3 is a block diagram illustrating a system environment for copying a source database to multiple target databases, according to an embodiment. The data stored in the source database 310 of the source database system is copied to two (or more) target databases including target database 340A of target database system 330A and target database 340B of target database system 330B. A consumer process 335A manages the copying of data to the target database 340A and the consumer process 335B manages copying of data to the target database 340B. The consumer processes 335A, 335B are shown as part of the target database systems 330A, 330B, but may be part of a different computing system, for example, a consumer system that is distinct from the target database system. A consumer process 335 executes a consumer process that manages the copying of the data. A consumer process may also be referred to herein as a consumer.

The testing framework 320 may execute test cases to validate the data stored in the target databases. For example, the testing framework 320 may perform an A/B test that compares certain property of the target databases 340A and 340B. For example, the testing framework 320 may compare the performance of the two target databases 340A, 340B by running some tests that measure performance. To be able to compare the two target databases 340A, 340B, the system ensures that the copy of the data stored in the two target databases 340A, 340B is consistent with respect to each other. For example, if there are differences in the data stored in the two target databases 340A, 340B, a test case may behave differently in the two target databases and the comparison of the two target databases based on the execution of the test cases may not be meaningful.

The state of the target database is determined by the transaction of the change data stream that is applied to the target database. The change data stream includes information describing the transactions of the entire source database or a subset of the source database, for example, the data corresponding to a tenant of a database storing data for a multi-tenant system. During the copy phase and the catchup phase, a target database is not expected to be point-in-time consistent with respect to the source database. During the live synchronization phase that target database is expected to be point-in-time consistent with respect to the source database. However, the consumer processes executed by the consumer processes 335A and 335B execute independently and write to different target databases 340A, 340B. Although the two consumer processes corresponding to consumer processes 335A and 335B process the same change data stream, they may process the change data streams at different speeds, for example, due to differences in hardware executing the consumer processes, other tasks being executed by the system executing the consumer process, the scheduling of tasks in the system executing the consumer process, and so on. Therefore, the two consumer processes follow independent time lines representing processing of the change data stream. For example, a transaction having a commit time $T_c$ may be processed by one of the consumer processes at time $T_{c1}$ and the other consumer process at time $T_{c2}$ which may be different from time $T_{c1}$. As a result, at a given point in time, the state of each of the target database system may be different and the tests executed on the two target databases may give different results due to the differences in the data stored in the two target databases.

The system ensures that the data copied in the two target databases at a particular point in time is consistent with respect to each other. Accordingly, the system ensures that the target database systems 340A, 340B store the same data so that the tests yield the same results. The system configures the target database systems with a pause timestamp. The consumer processes stop processing any transaction that has a commit timestamp beyond the pause timestamp. Both target database systems pause stop processing the transactions resulting in the target database systems reaching a consistent state.

Figure 4:
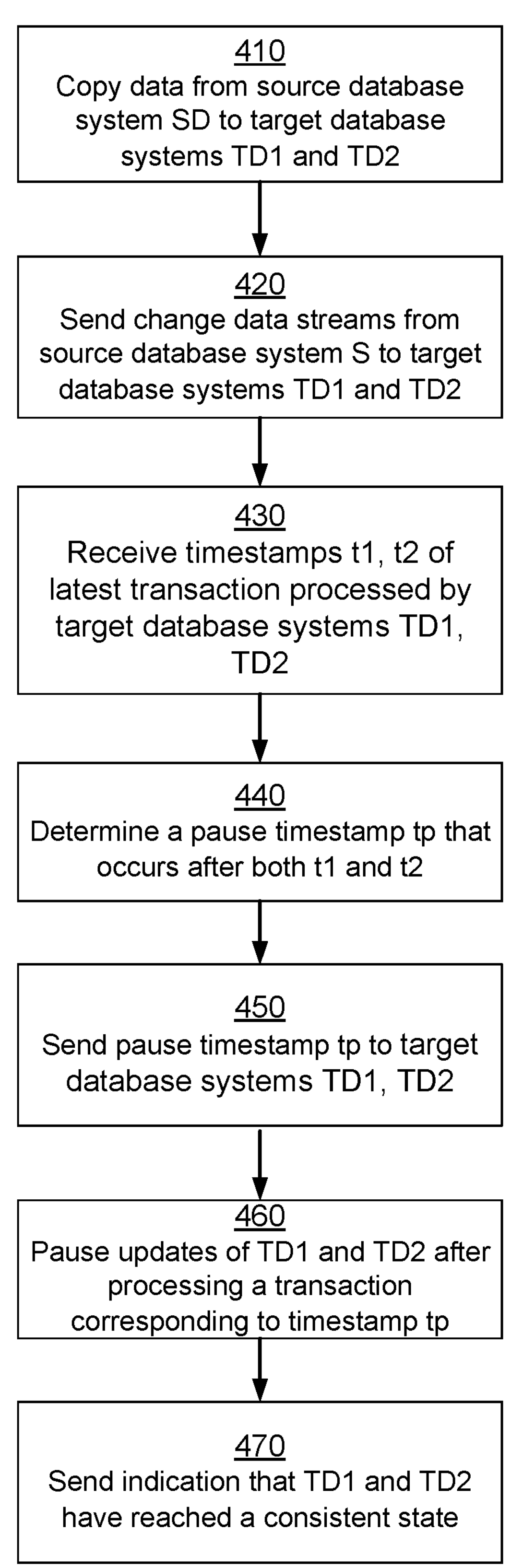
FIG. 4 is a flow chart illustrating the process for copying a source database to multiple target databases, according to one embodiment.

FIG. 4 is a flow chart illustrating the process 400 for copying a source database to multiple target databases, according to one embodiment. Steps shown in FIG. 4 may be executed by modules different from those indicated herein. Various embodiments can perform the steps of the processes in different orders than those indicated herein. Moreover, other embodiments can include different and/or additional steps than the ones described herein.

The process 400 is executed during the live synchronization phase. The source database system is referred to as SD and the target database systems are referred to as target database system TD1 and target database system TD2. For example, the target database systems TD1 and TD2 may correspond to the target database systems 330A and 330B of FIG. 3.

The system copies 410 data from a source database system SD to the target database systems TD1 and TD2. The data copy may include the bulk copy phase and the catchup phase of data copy as shown in steps 210 and 220 of FIG. 2.

The system sends 420 change data streams from the source database system SD to the target database systems TD1 and TD2 for performing data updates, for example, as part of the live synchronization phase as shown in step 230 of FIG. 2. The consumer processes 335A, 335B analyze the corresponding change data streams to identify transactions committed by the source database system that are included in the received change data stream and apply the identified transactions to the corresponding target database 340A, 340B.

According to an embodiment, the system determines when the target database systems reach live synchronization state. Once the system determines that the target database systems have reached the live synchronization state, the consumer process configurations are updated with a pause timestamp.

The system receives 430 a timestamp $t_1$ of a latest transaction processed by the target database system TD1 and a timestamp $t_2$ of a latest transaction processed by the target database system TD2. The timestamps $t_1$ and $t_2$ represent time points after the consumer process is in live synchronization phase.

The system determines 440 a pause timestamp $t_p$ that occurs after the timestamp $t_1$ and the timestamp $t_2$. According to an embodiment, the system determines $t_{config}$ representing the time required to update the configuration of a consumer process and the pause timestamp $t_p$ is determined as a value $t_p >= t_{config} + \max(t_1, t_2)$. Accordingly, the system determines the pause time $t_p$ by determining the larger of the two timestamps $t_1$ and $t_2$ and adding the value of $t_{config}$ to it. The system uses $t_p$ as the commit timestamp of a transaction such that each consumer process pauses once it updates the target database with a transaction having the timestamp $t_p$. According to an embodiment, each consumer pauses once it encounters a transaction having a commit timestamp that is greater than timestamp $t_p$ and within a predetermined threshold value, for example, within a minute of timestamp $t_p$. This is so because the timestamps are compared at a resolution of the predetermined threshold value, for example, a minute.

In some cases, the target databases may process the transactions faster than the rate at which the wall clock time (or the system clock time) moves. If the system detects that the target databases are processing the transactions faster than the rate at which the wall clock time moves, the system updates the value of timestamp $t_p$ based on the equation.

A consumer process is deployed with an initial configuration of pause timestamp as an undefined value. Accordingly, the consumer processes continue to process the transactions indefinitely. Once the consumer process configurations are updated to a particular value of the pause timestamp $t_p$, the consumer processes pause the processing of the transactions based on the value of the pause timestamp $t_p$.

The system sends 450 the pause timestamp $t_p$ to the target database system TD1 and the target database system TD2. The target database systems TD1 and TD2 pause 460 data updates after processing a transaction corresponding to the pause timestamp $t_p$. The consumer processes corresponding to the target databases TD1 and TD2 receive a configuration that is pushed to the target databases for pausing the updates. Since pushing a configuration to a consumer process can take at least a threshold time, the system accounts for the time takes to push the configuration when determining a timestamp for pausing the target database compared to the current transactions being processed. Once the target database systems TD1 and TD2 pause the data updates, the system sends 470 an indication that the target database systems TD1 and TD2 have reached a consistent state with respect to each other.

As an example, if pause timestamp is 10/10/2022 10:00 mins, consumer processes pause upon receiving a transaction with Commit timestamp 10/10/2022 10:01. The consumer process will process transactions with commit timestamp that are within a minute of the pause timestamp, for example, 10/10/2022 10:00:01 (sec) since the timestamps are compared at one minute resolution and 10/10/2022 10:00:01 timestamp is treated same as 10/10/2022 10:00 timestamp.

Figure 5:
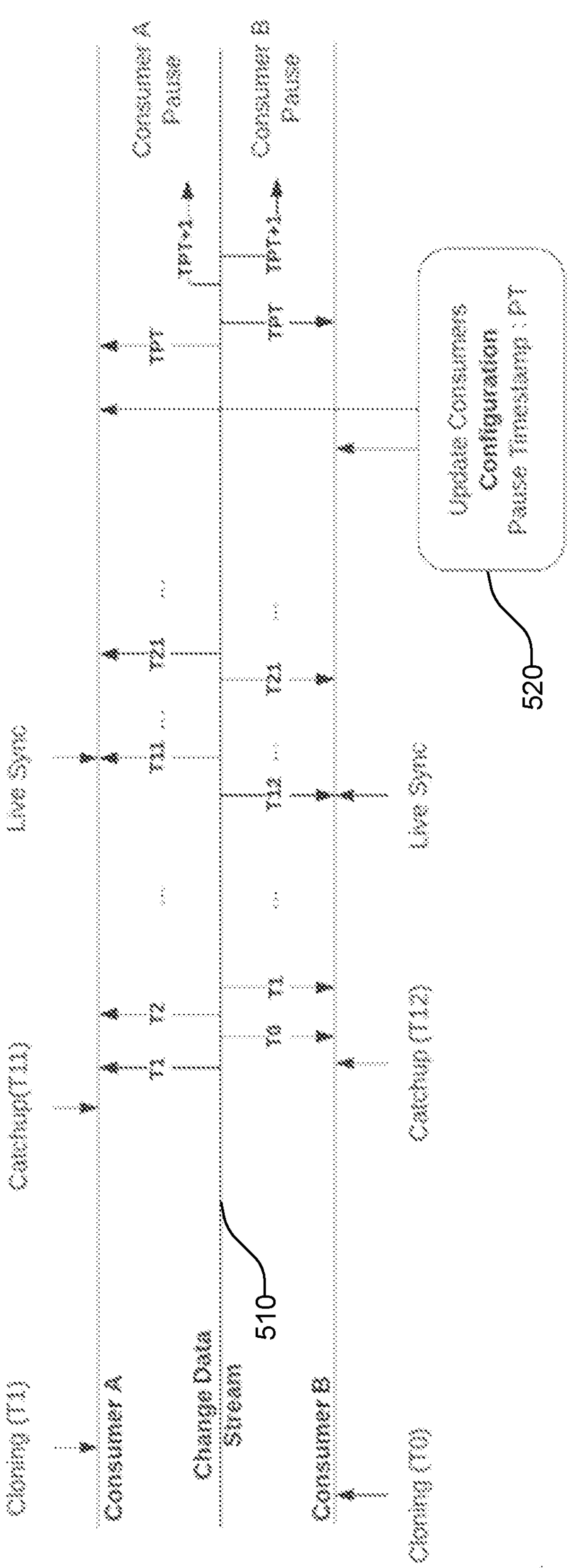
FIG. 5 shows an example timeline of the process for copying a source database to multiple target databases, according to one embodiment.

FIG. 5 shows an example timeline of the process for copying a source database to multiple target databases, according to one embodiment. FIG. 5 illustrates that the copying of data for the two target database systems as performed by the consumer processes proceeds at different speeds of execution and is performed independent of each other. As shown in FIG. 5, the two consumer processes are consumer process A and consumer process B. The change data stream 510 is sent to the two target database systems. Consumer process A starts the bulk copy phase (cloning) with transaction T1 and consumer B starts the closing process with transaction TO. The transactions that were executed between the time cloning starts and ends are processed during the catchup phase. The catchup phase for consumer A ends with transaction T11 and the catchup phase for consumer B ends with transaction T12. Accordingly, the live synchronization phase starts for consumer A after transaction T11 and for consumer B after transaction T12. The system determines a pause timestamp TPT and sends to each consumer process. The consumer process configurations are updated 520 with the pause timestamp TPT. The systems execute the transactions up to the pause timestamp TPT and then pause execution after that.

The system according to various embodiments, provides a mechanism to coordinate among multiple independent services/processes to deliver point-in-time consistent copies across multiple databases. The system may use the point-in-time consistent copies for performing A/B testing using the multiple databases. The system may use the point-in-time consistent copies for A/B validation against application behaviors. For example, the system may be used to ensure that a particular application behaves the same way across different database types, different database architectures, or across databases provided by different database vendors. This may be used to test different application versions across multiple databases storing the same data. The system may be used for testing migration of databases from one system to another. For example, the source database system may run in a physical datacenter of an organization whereas the target databases may run in a cloud platform.

Parallel Copying of Database

Embodiments create a point-in-time consistent copy of a database or a subset of data, for example, data of a tenant (e.g., an organization) of a multi-tenant system from source database system to a target database system using multiple change data streams that are processed in parallel.

In order keep the target database system point-in-time transactionally consistent with respect to the source database system, the transactions committed in the source database system are applied to the target database system. The system processes change streams in in causal order and each transaction committed on the source database system is applied to the target database system in entirety. Performing the copying of the database system using a single change data stream may result in slow performance.

The system overcomes the performance limitations by partitioning the change data stream and processing each partitioned change data stream in parallel. According to an embodiment, the system partitions the database schema into subsets of tables such that each partitioned change data stream processes changes to tables of a subset of the tables. A subset of database tables corresponding to a partitioned change data stream is also referred to herein as a partition. This allows for horizontal scalability of the change data stream processing and therefore improves the execution performance of the database copying process. A partitioned change data stream may also be referred to herein as a change data stream.

Partitioning the change data streams into multiple partitioned change data streams results in following challenges. A transaction may process tables that belong to two distinct subsets of tables, each subset of tables processed by one partitioned change data stream. As a result, a transaction may split into multiple partitioned change data streams. The partitioned change data streams are applied to the target database system at different speeds due to differences in the hardware or the load of the systems processing the partitioned change data streams. As a result, the timestamp of a transaction of one partitioned change data stream that is processed may be significantly distinct from the timestamp of another partitioned change data stream being processed. Accordingly, if the processing of the partitioned change data streams is paused at any time, the resulting target database may not be in a consistent state since only a part of a transaction that was received as one partitioned change data stream may be applied to the target database system while the remaining part of the same transaction being received as another partitioned change data stream may not have been applied to the target database system. As a result, the target database system may not be in a consistent state even though each individual consumers are executing the live synchronization phase of the database copy.

Figure 6:
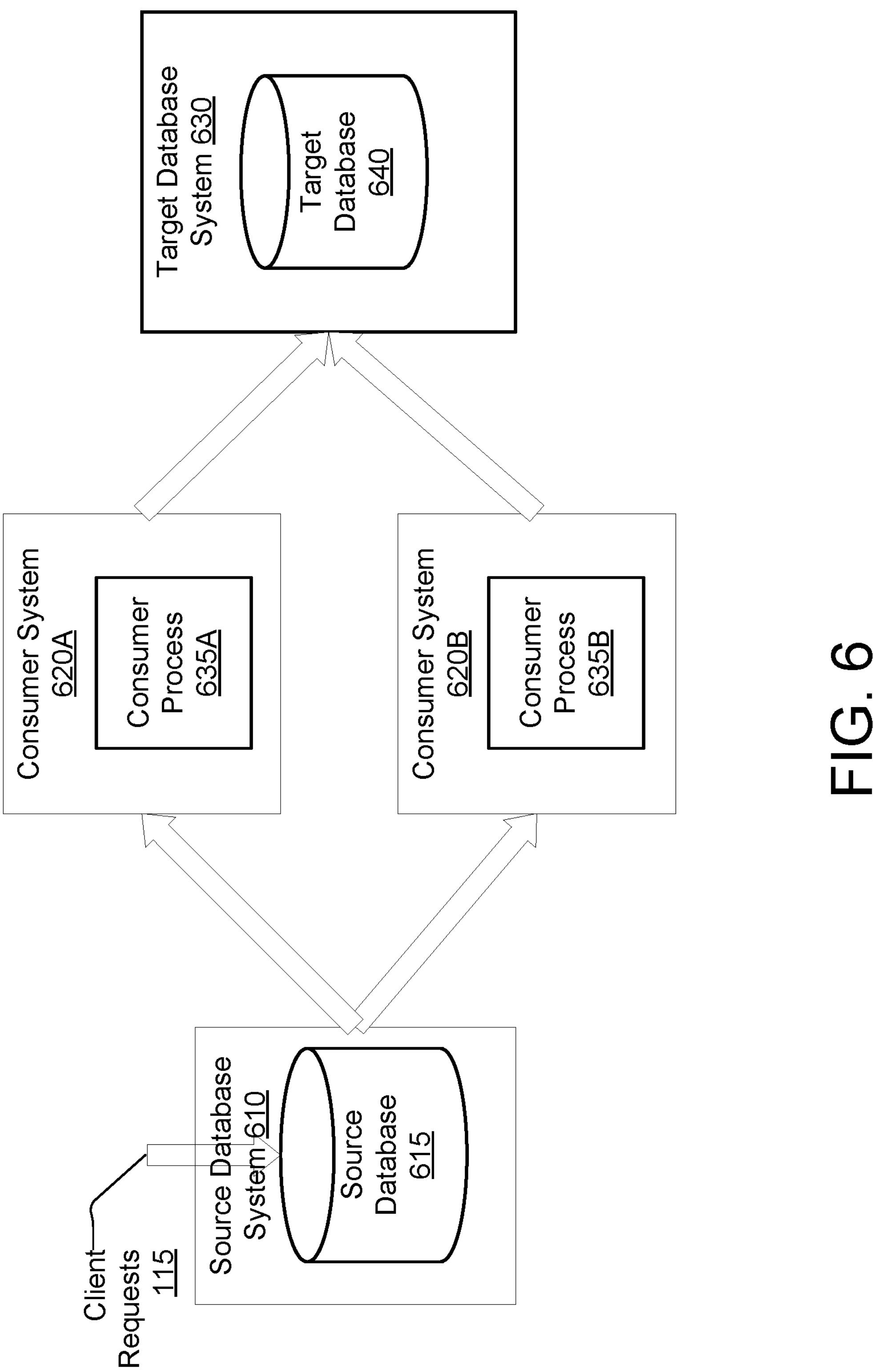
FIG. 6 is a block diagram illustrating a system environment for copying a source database to a target database using multiple partitioned change data streams, according to an embodiment.

FIG. 6 is a block diagram illustrating a system environment 600 for copying a source database to a target database using multiple partitioned change data streams, according to an embodiment. The system environment 600 includes a source database system 610, a target database system 630, and a plurality of consumer systems including consumer system 620A and consumer system 620B. Other embodiments may include more or fewer systems and components than shown in FIG. 6.

The source database system 610 includes a source database 615 that is copied to a target database 640 in the target database system 630. The copying of the database is performed using the process shown in FIG. 2. The copying is performed using multiple partitioned change data streams. Each change data stream is processed by a consumer system 620. A consumer system 620A, 620B includes a consumer process 635 with instructions to process the change data stream. For example, consumer system 620A includes consumer process 635A and the consumer system 620B includes consumer process 635B.

Since the change data stream is partitioned, the following may happen to a transaction. The transaction may be entirely part of a single partitioned change data stream since it processes only the tables belonging to the partition corresponding to the partitioned change data stream. Alternatively, the transaction may process tables that belong to two different partitions and as a result information describing the transaction is included in two different partitioned change data streams corresponding to the two partitions.

It is possible that processing of one of the change data stream is extremely slow or may have failed, for example, due to hardware failure, such as network failure. The system may not be able to differentiate between a situation in which there are no transactions being executed during a time window in a subset of database tables associated with a partitioned change data stream compare to a situation in which here are transactions being executed during a time window in the subset of database tables associated with the partitioned change data stream but they are not being reported due to failure of the processing of the partitioned change data stream.

The system handles the issue of differentiating between a slow execution of a change data stream and a failed change data stream by including dummy transactions. A dummy transaction may also be referred to as a heartbeat transaction.

The system includes dummy transactions representing transactions that do not contain any application specific data that need to be applied to the target database. A dummy transaction is part of all the partitioned streams. For example, the system may include a dummy table in all partitions and perform a transaction using the dummy table. Since the consumer process recognizes the dummy transaction is not application specific, the system uses dummy transactions in conjunction with pause timestamp to determine whether a change data stream has failed or not. The consumer process may not perform any database updates when a dummy transaction is encountered in the change data stream. According to an embodiment, a dummy transaction has no data since there is no update operation performed in the dummy transaction. Accordingly, a dummy transaction acts as a marker. The dummy transaction is sent periodically, for example, one dummy transaction every minute or any other fixed length of time interval. According to an embodiment, the dummy transaction includes metadata that allows the consumer processes to distinguish a dummy transaction from other transactions so that a consumer process can process the dummy transaction separately. For example, the consumer process is configured to not perform any updates when a dummy transaction is encountered. The dummy transactions ensure that every partitioned change data stream receives a transaction at a periodic interval whether or not there are any changes to tables in the partitions corresponding to those change data streams. For example, even if there are no updates performed to any table in a partition corresponding to a partitioned change data stream, the partitioned change data stream includes the dummy transaction at a predetermined periodicity. Accordingly, if the consumer process does not encounter a dummy transaction within a threshold time period determined based on the predetermined periodicity, the consumer process may send an indication of a failure of the change data stream. For example, the consumer process may send for display an error status on a dashboard configured to display the status of the database copy operation. Alternately the consumer process may send an alter message to a user, for example, a system administrator or a database administrator.

Figure 7:
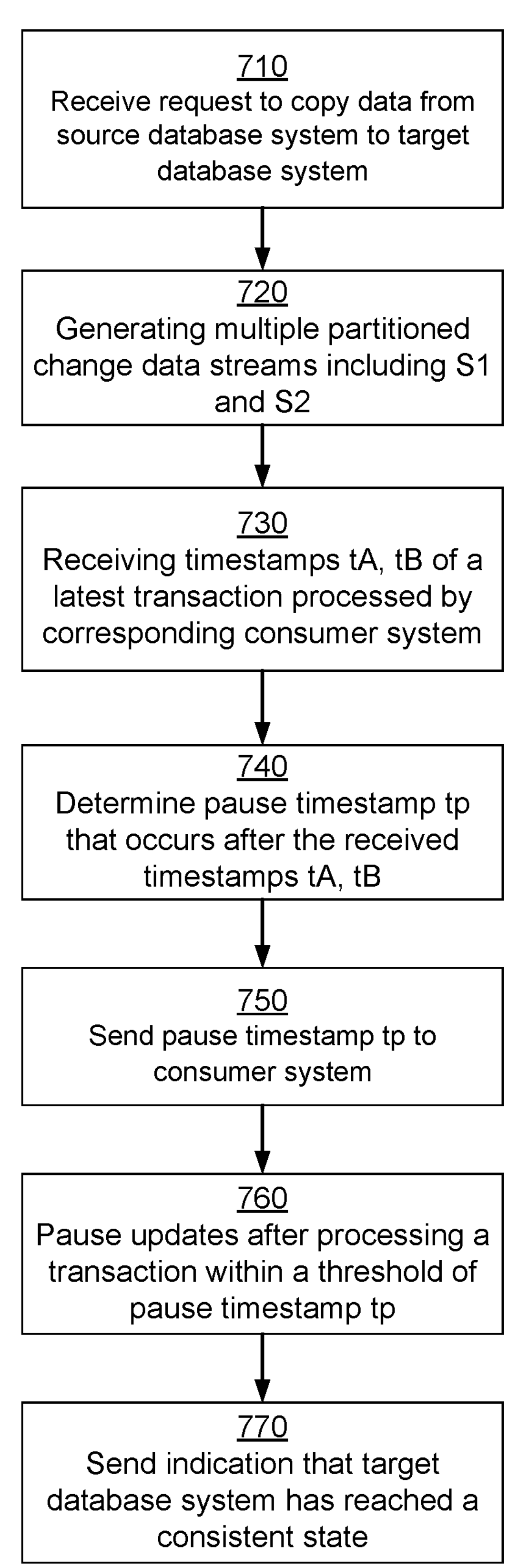
FIG. 7 is a flow chart illustrating the process for copying a source database to multiple target databases, according to one embodiment.

FIG. 7 is a flow chart illustrating the process for copying a source database to multiple target databases, according to one embodiment. Steps shown in FIG. 7 may be executed by modules different from those indicated herein. Various embodiments can perform the steps of the processes in different orders than those indicated herein. Moreover, other embodiments can include different and/or additional steps than the ones described herein.

The system receives 710 a request to copy data from a source database system 610 to a target database system 630. The system generates multiple partitioned change data streams. For example, the system may generate partitioned change data streams S1 and S2 such that partitioned change data stream S1 is processed by the consumer system 620A and partitioned change data stream S2 is processed by the consumer system 620B. Each consumer systems 620A, 620B analyzes the received partitioned change data stream to identify transactions committed by the source database system that are included in the received partitioned change data stream and apply the identified transactions to the target database 640.

The system receives 730 a timestamp $t_A$ of the latest transaction processed by consumer process 635A and applied to the target database system 630 a timestamp $t_B$ of the latest transaction processed by consumer process 635B and applied to the target database system 630. The system determines 740 a pause timestamp $t_p$ that occurs after the received timestamps $t_A$ and $t_B$. According to an embodiment, the system determines $t_{config}$ representing the time required to update the configuration of a consumer process and determines the pause timestamp $t_p$ as a value $t_p >= t_{config} + \max(t_A, t_B)$. Accordingly, the system determines the pause time $t_p$ by determining the larger of the two timestamps $t_A$ and $t_B$ and adding the value of $t_{config}$ to it. Similar to the use of pause timestamp in the case of multiple target databases as shown in FIG. 3, the system uses $t_p$ as the commit timestamp of a transaction such that each consumer process pauses once it updates the target database with a transaction having the timestamp $t_p$. A consumer process pauses once it processes a transaction having a commit timestamp that is greater than timestamp $t_p$ and within a predetermined threshold value, for example, within a minute of timestamp $t_p$. The timestamps may be compared at a resolution of the predetermined threshold value, for example, a minute.

The system sends 750 the pause timestamp to the consumer systems 620A, 620B. The consumer systems 620 are configured to pause after processing a transaction that has a timestamp within a predetermined threshold of the pause timestamp $t_p$. The consumer processes 635A, 635B pause 760 updates to the target database system 640 after processing a transaction that has a timestamp within a predetermined threshold of the pause timestamp $t_p$. Once the processing is paused 760 by the consumer processes 635A, 635B the system sends an indication that the target database 640 has reached a consistent state. The system may start any processing using the target database 640, for example, any testing. The techniques described in connection with the user of pause timestamps for multiple target database systems as shown in the system environment 300 shown in FIG. 3 are applicable to the system environment 600 with a single target database system and multiple partitioned change data streams as shown in FIG. 6.

According to an embodiment, the system waits for a predetermined time interval for a transaction having a timestamp within a threshold of the pause timestamp from a particular partitioned change data stream. If the system determines that no transaction having a timestamp within the threshold of the pause timestamp has arrived via the particular partitioned change data stream, the system sends an indication of a failure of data transfer via that particular partitioned change data stream.

Figure 8:
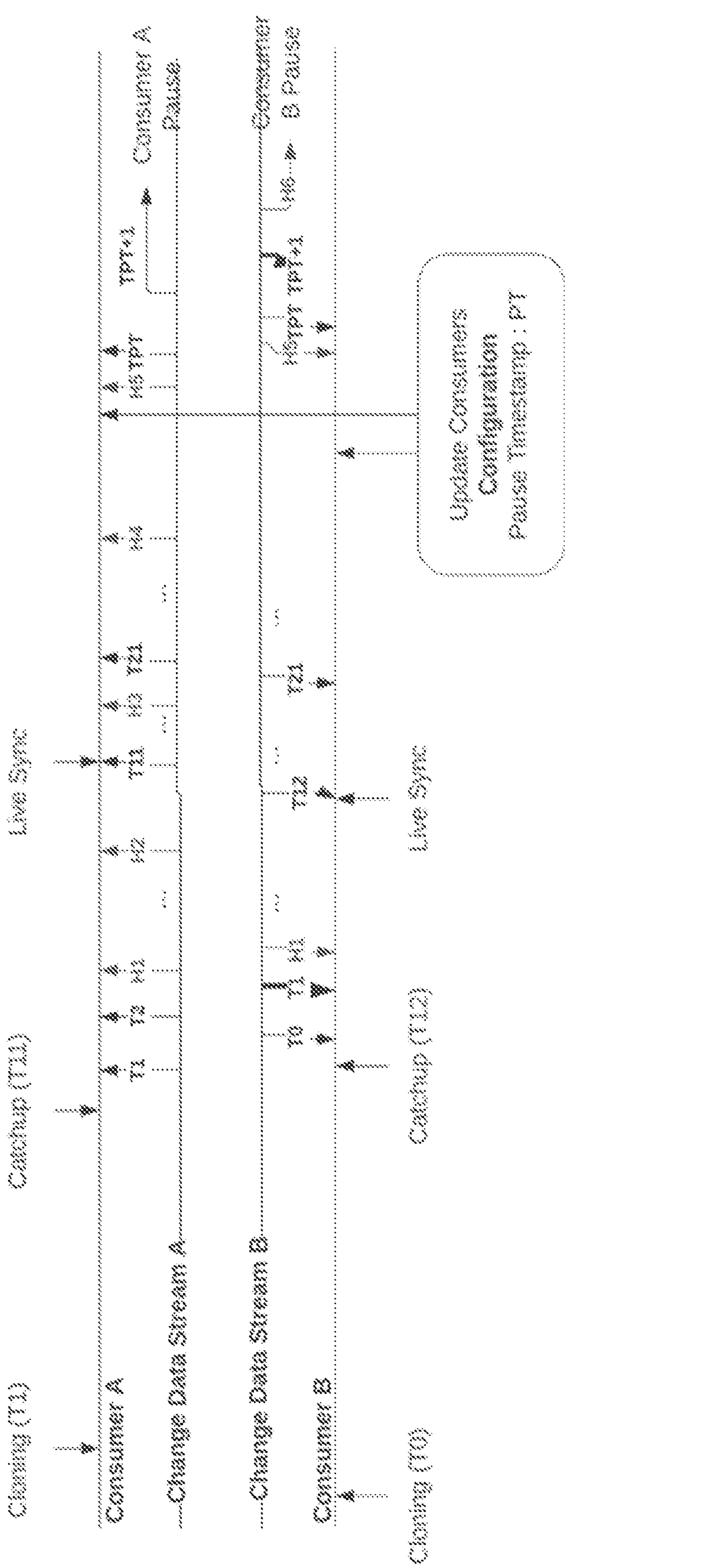
FIG. 8 shows an example timeline of the process for copying a source database to multiple target databases, according to one embodiment.

FIG. 8 shows an example timeline of the process for copying a source database to multiple target databases, according to one embodiment. FIG. 8 shows two partitioned change data streams, i.e., partitioned change data stream A and partitioned change data stream B. The change data streams include the dummy transactions indicated as H1, H2, H3, and so on. A dummy transaction is included in both partitioned change data streams A, B. The processing illustrated by the timeline shown in FIG. 8 is similar to the processing shown in the timeline illustrated in FIG. 5. As shown in FIG. 8, there are two consumer processes, consumer process A processing the partitioned change data stream A, and consumer process B processing the partitioned change data stream B. The change data stream 510 is sent to the two target database systems. Consumer A starts the bulk copy phase (cloning) with transaction T1 and consumer B starts the bulk copy phase with transaction TO. The transactions that were executed between the time cloning starts and ends are processed during the catchup phase. The catchup phase for consumer A ends at time T11 and the catchup phase for consumer B ends at time T12. Accordingly, the live synchronization phase starts for consumer A at time T11 and for consumer B at time T12. The system determines a pause timestamp TPT and sends to each consumer process. The consumer process configurations are updated 520 with the pause timestamp TPT. The systems execute the transactions up to the pause timestamp TPT and then pause execution after that.

Computer Architecture

Figure 9:
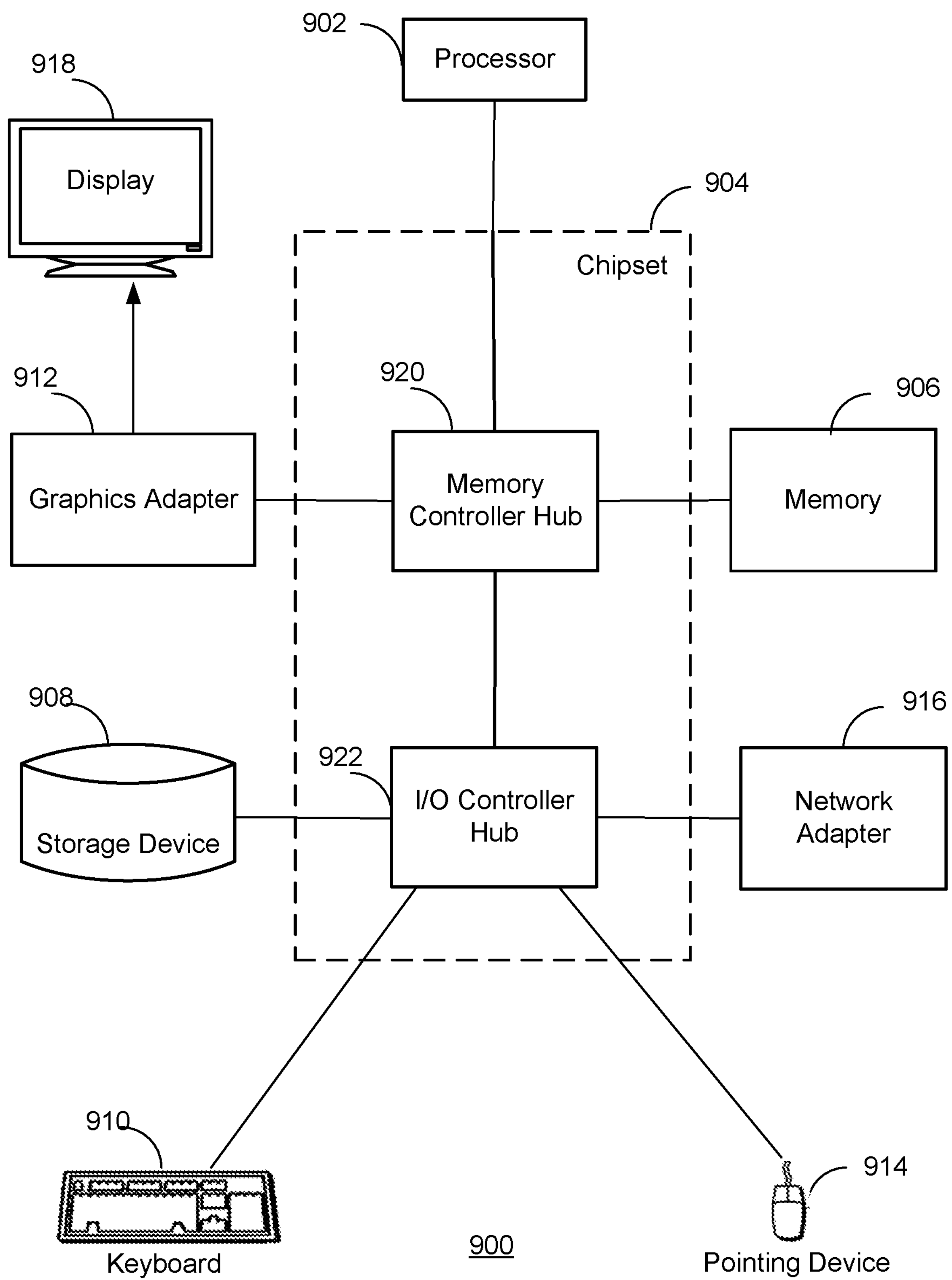
FIG. 9 is a block diagram illustrating a functional view of a typical computer system for use in the environment of FIG. 1 according to one embodiment.

FIG. 9 is a high-level block diagram illustrating a functional view of a typical computer system for use as one of the entities illustrated in the environment 100 of FIG. 1 according to an embodiment. Illustrated are at least one processor 902 coupled to a chipset 904. Also coupled to the chipset 904 are a memory 906, a storage device 908, a keyboard 910, a graphics adapter 912, a pointing device 914, and a network adapter 916. A display 918 is coupled to the graphics adapter 912. In one embodiment, the functionality of the chipset 904 is provided by a memory controller hub 920 and an I/O controller hub 922. In another embodiment, the memory 906 is coupled directly to the processor 902 instead of the chipset 904.

The storage device 908 is a non-transitory computer-readable storage medium, such as a hard drive, compact disk read-only memory (CD-ROM), DVD, or a solid-state memory device. The memory 906 holds instructions and data used by the processor 902. The pointing device 914 may be a mouse, track ball, or other type of pointing device, and is used in combination with the keyboard 910 to input data into the computer system 200. The graphics adapter 912 displays images and other information on the display 918. The network adapter 916 couples the computer system 900 to a network.

As is known in the art, a computer 900 can have different and/or other components than those shown in FIG. 9. In addition, the computer 900 can lack certain illustrated components. For example, a computer system 900 acting as an online system 110 may lack a keyboard 910 and a pointing device 914. Moreover, the storage device 908 can be local and/or remote from the computer 900 (such as embodied within a storage area network (SAN)).

The computer 900 is adapted to execute computer modules for providing the functionality described herein. As used herein, the term “module” refers to computer program instruction and other logic for providing a specified functionality. A module can be implemented in hardware, firmware, and/or software. A module can include one or more processes, and/or be provided by only part of a process. A module is typically stored on the storage device 908, loaded into the memory 906, and executed by the processor 902.

The types of computer systems 900 used by the entities of FIG. 1 can vary depending upon the embodiment and the processing power used by the entity. For example, a client device 104 may be a mobile phone with limited processing power, a small display 918, and may lack a pointing device 914. The online system 110 in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

What is claimed is:

1. A method for generating consistent copies of data stored in a source database system in a plurality of target database systems, comprising:

streaming change data from the source database system to the plurality of target database systems, wherein the change data identifies database operations of a series of transactions committed at the source database system;

receiving a plurality of timestamps from the plurality of target database systems, wherein a given one of the plurality of timestamps is indicative of a latest transaction of the series of transactions that has been processed by a respective one of the plurality of target database systems;

determining, based on the plurality of timestamps, a pause timestamp to be subsequent to a latest of the plurality of timestamps by a time delay comprising an estimated time to configure a target database system to stop applying ones of the database operations based on the pause timestamp;

sending, to the plurality of target database systems, the pause timestamp to cause each target database system to stop processing transactions of the series of transactions after reaching a particular transaction in the series that satisfies a condition involving the pause timestamp; and responsive to the plurality of target database systems stopping processing transactions of the series, sending an indication that the plurality of target database systems have reached a consistent state with respect to each other.

2. The method of claim 1, further comprising:

responsive to determining that the plurality of target database systems have reached a consistent state with respect to each other, performing testing of the plurality of target database systems.

3. The method of claim 1, wherein the plurality of target database systems includes a first target database system that is from a first database provider and a second target database system that is from a second database provider.

4. The method of claim 1, wherein the plurality of target database systems includes a first target database system that is executing on a first type of hardware and a second target database system that is executing on a second type of hardware.

5. The method of claim 1, further comprising:

prior to the streaming of the change data, performing a bulk copy of data stored in the source database system to the plurality of target database systems.

6. The method of claim 5, wherein the plurality of target database systems includes a first target database system and a second target database system, and wherein the method further comprises:

responsive to completing the bulk copy for the first target database system, sending data of a first set of transactions to the first target database system, wherein the first set of transactions were executed at the source database system during the bulk copy of the data for the first target database system;

updating the first target database system using the first set of transactions;

responsive to completing the bulk copy for the second target database system, sending data of a second set of transactions to the second target database system, wherein the second set of transactions were executed at the source database system during the bulk copy of the data for the second target database system; and updating the second target database system using with the second set of transactions.

7. The method of claim 6, wherein the change data is streamed as a part of a synchronization phase that occurs after the bulk copy, and wherein the determining of the pause timestamp is performed responsive to determining that the first target database system and the second target database system have both reached the synchronization phase.

8. A non-transitory computer readable storage medium for storing instructions that when executed by one or more computer processors cause the one or more computer processors to perform steps comprising:

streaming change data from a source database system to a plurality of target database systems, wherein the change data identifies database operations of a series of transactions committed at the source database system;

receiving a plurality of timestamps from the plurality of target database systems, wherein a given one of the plurality of timestamps is indicative of a latest transaction of the series of transactions that has been processed by a respective one of the plurality of target database systems;

determining, based on the plurality of timestamps, a pause timestamp to be subsequent to a latest of the plurality of timestamps by a time delay comprising an estimated time to configure a target database system to stop applying ones of the database operations based on the pause timestamp;

sending, to the plurality of target database systems, the pause timestamp to cause each target database system to stop processing transactions of the series of transactions after reaching a particular transaction in the series that satisfies a condition involving the pause timestamp; and responsive to the plurality of target database systems stopping processing transactions of the series, sending an indication that the plurality of target database systems have reached a consistent state with respect to each other.

9. The non-transitory computer readable storage medium of claim 8, wherein the steps further comprise:

responsive to determining that the plurality of target database systems have reached a consistent state with respect to each other, performing testing of the plurality of target database systems.

10. The non-transitory computer readable storage medium of claim 8, wherein the plurality of target database systems includes a first target database system that is from a first database provider and a second target database system that is from a second database provider.

11. The non-transitory computer readable storage medium of claim 8, wherein the plurality of target database systems includes a first target database system that is executing on a first type of hardware and a second target database system that is executing on a second type of hardware.

12. The non-transitory computer readable storage medium of claim 8, wherein the steps further comprise:

prior to the streaming of the change data, performing a bulk copy of data stored in the source database system to the plurality of target database systems.

13. The non-transitory computer readable storage medium of claim 12, wherein the plurality of target database systems includes a first target database system and a second target database system, and wherein the steps further comprise:

responsive to completing the bulk copy for the first target database system, sending data of a first set of transactions to the first target database system, wherein the first set of transactions were executed at the source database system during the bulk copy of the data for the first target database system;

updating the first target database system using the first set of transactions;

responsive to completing the bulk copy for the second target database system, sending data of a second set of transactions to the second target database system, wherein the second set of transactions were executed at the source database system during the bulk copy of the data for the second target database system; and updating the second target database system using with the second set of transactions.

14. The non-transitory computer readable storage medium of claim 13, wherein the change data is streamed as a part of a synchronization phase that occurs after the bulk copy, and wherein the determining of the pause timestamp is performed responsive to determining that the first target database system and the second target database system have both reached the synchronization phase.

15. A system, comprising:

one or more processors; and memory having program instructions stored thereon that are executable by the one or more processors to cause the system to perform steps comprising:

streaming change data from a source database system to a plurality of target database systems, wherein the change data identifies database operations of a series of transactions committed at the source database system;

receiving a plurality of timestamps from the plurality of target database systems, wherein a given one of the plurality of timestamps is indicative of a latest transaction of the series of transactions that has been processed by a respective one of the plurality of target database systems;

determining, based on the plurality of timestamps, a pause timestamp to be subsequent to a latest of the plurality of timestamps by a time delay comprising an estimated time to configure a target database system to stop applying ones of the database operations based on the pause timestamp;

sending, to the plurality of target database systems, the pause timestamp to cause each target database system to stop processing transactions of the series of transactions after reaching a particular transaction in the series that satisfies a condition involving the pause timestamp; and responsive to the plurality of target database systems stopping processing transactions of the series, sending an indication that the plurality of target database systems have reached a consistent state with respect to each other.

16. The system of claim 15, wherein the steps further comprise:

responsive to determining that the plurality of target database systems have reached a consistent state with respect to each other, performing testing of the plurality of target database systems.

17. The system of claim 15, wherein the steps further comprise:

prior to the streaming of the change data, performing a bulk copy of data stored in the source database system to the plurality of target database systems.

* * * * *